United States Patent
Sim et al.

(10) Patent No.: US 8,005,118 B2
(45) Date of Patent: Aug. 23, 2011

(54) METHOD AND APPARATUS FOR IMPLEMENTING SECURE CLOCK IN DEVICE HAVING NO INTERNAL POWER SOURCE

(75) Inventors: Sang-gyoo Sim, Suwon-si (KR); Yun-sang Oh, Seoul (KR); Kyung-im Jung, Seongnam-si (KR); Suk-bong Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 517 days.

(21) Appl. No.: 11/634,101

(22) Filed: Dec. 6, 2006

(65) Prior Publication Data

US 2007/0133614 A1    Jun. 14, 2007

(30) Foreign Application Priority Data

Dec. 6, 2005    (KR) .................... 10-2005-0118164

(51) Int. Cl.
*H04J 3/06* (2006.01)

(52) U.S. Cl. .......... 370/503; 713/320; 713/340; 714/14; 714/22; 370/350

(58) Field of Classification Search .......... 714/14, 714/22, 24; 713/320, 322, 340; 709/219, 709/232; 706/31; 370/342, 498, 350, 503

See application file for complete search history.

(56) References Cited

U.S. PATENT DOCUMENTS

| | | | |
|---|---|---|---|
| 2003/0233553 | A1 | 12/2003 | Parks et al. |
| 2004/0117483 | A1* | 6/2004 | Singer et al. ................. 709/225 |
| 2004/0215909 | A1 | 10/2004 | Imai et al. |
| 2005/0038757 | A1 | 2/2005 | Wada |
| 2005/0086326 | A1* | 4/2005 | Manning et al. ............. 709/219 |
| 2006/0020855 | A1* | 1/2006 | Okada et al. .................. 714/14 |
| 2006/0059094 | A1* | 3/2006 | Oh et al. ........................ 705/51 |

FOREIGN PATENT DOCUMENTS

| | | | |
|---|---|---|---|
| CN | 1348558 A | 5/2002 | |
| JP | 62-226294 A | 10/1987 | |
| JP | 2003-272286 A | 9/2003 | |
| JP | 2005-063079 A | 3/2005 | |
| KR | 2004-0092450 A | 11/2004 | |
| KR | 20-0383978 Y1 | 5/2005 | |
| KR | 2005-0073802 A | 7/2005 | |

* cited by examiner

*Primary Examiner* — Huy D Vu
*Assistant Examiner* — Dady Chery
(74) *Attorney, Agent, or Firm* — Sughrue Mion, PLLC

(57) ABSTRACT

A method and apparatus for implementing a secure clock having no internal power source are disclosed. The apparatus accesses a host device having an internal power source and transmits and receives data. The apparatus includes a clock control unit, a counter, and a time information unit. The clock control unit performs control such that the time information of the host device is acquired and a counter value corresponding to the acquired time information is set, when the clock control unit is connected to the host device and is supplied with power from the host device. The counter changes the set counter value in steps of a predetermined value at regular time intervals while the power is supplied. The time information unit updates current time information to correspond to the changed counter value while the power is supplied.

18 Claims, 6 Drawing Sheets

METHOD AND APPARATUS FOR IMPLEMENTING SECURE CLOCK IN DEVICE HAVING NO INTERNAL POWER SOURCE

CROSS-REFERENCE TO RELATED APPLICATION

This application claims priority from Korean Patent Application No. 10-2005-0118164 filed on Dec. 6, 2005 in the Korean Intellectual Property Office, the disclosures of which is incorporated herein by reference in its entirety.

BACKGROUND OF THE INVENTION

1. Field of the Invention

Apparatuses and methods consistent with the present invention relate to implementing a secure clock having no internal power source.

2. Description of the Related Art

It is common for recent secure services to require accurate time information. Accurate time information also plays an important role in authentication and electronic signatures. Time information is utilized to verify a counterpart's authentication value or signature value. There are cases where the validity of the license or rights is limited using time information in Digital Rights Management (DRM). For example, the right to execute some content can be set to be valid within a specific time period. In reality, such a function is used for rights objects used in Open Mobile Alliance (OMA) DRM and licenses used in Microsoft's Windows Media DRM.

In order to meet such needs, it is necessary to implement a clock within a device. In a completely secure clock, time cannot be arbitrarily changed by a user; time information must be set only using a secure clock source. Since a clock must continuously operate even when it is implemented within a device, the device must have a battery therein. However, devices, such as a memory card and a smart card, do not have batteries therein. Furthermore, it is very difficult to update the time information of devices that cannot directly access the clock source.

Figure 1:
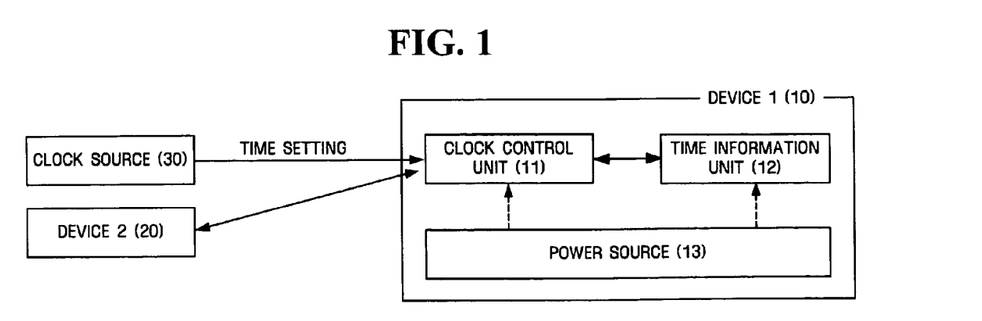
FIG. 1 is a block diagram showing the construction of a conventional secure clock.

The construction of a conventional secure clock includes a clock source 30, a device 1 (10) possessing a license or rights, and a device 2 (20) accessing the device 1 (10) and possessing and executing content, as shown in FIG. 1.

A clock control unit 11 included in the device 1 (10) acquires accurate time information from the external clock source 30, and sets and stores current time information in a time information unit 12 based on the acquired time information. Furthermore, the clock control unit 11 precludes a user from attempting to directly modify time information, thus preventing arbitrary manipulation that is not based on the clock source 30.

A power source 13 supplies power to the clock control unit 11 and the time information unit 12. As described above, the conventional device 1 (10) essentially requires an internal power source and does not provide a method of operating the clock when power is not supplied.

The clock source 30 exists outside the device 1 (10) and is a supply source for providing accurate current time information to the device 1 (10). The clock source 30 is generally operated by a trustworthy third party. If there are several clock sources, it is necessary to synchronize the time information of the clock sources.

In the construction of FIG. 1, the device 1 (10) and the device 2 (20) perform the following operation in order to maintain a trustworthy and secure clock.

Each of the devices 10 and 20 receives trustworthy time information from a clock source and stores the received time information therein. If the devices 10 and 20 cannot directly access the clock source but can access a counterpart device, the counterpart device receives time information from the clock source.

If the device 1 (10) and the device 2 (20) are connected to each other, they exchange and compare the pieces of stored time information and synchronize the pieces of time information based on the time information stored later. Synchronization is performed by storing the time information stored later in the time information unit 12. As a result, the two devices 10 and 20 maintain the same time information.

Such time information synchronization can be effectively used in a distributed environment. In a distributed environment such as a ubiquitous environment, devices may exist which cannot directly access a clock source. Accordingly, the devices receive and store time information stored in another device.

Meanwhile, an example of communication between the conventional device having no power source therein and a host device having a power source therein may be communication between a recordable medium such as a memory card, and the host device. A memory card device conventionally used as a simple data storage device has been used as a device for storing a rights object or a license to apply security policies.

Figure 2:
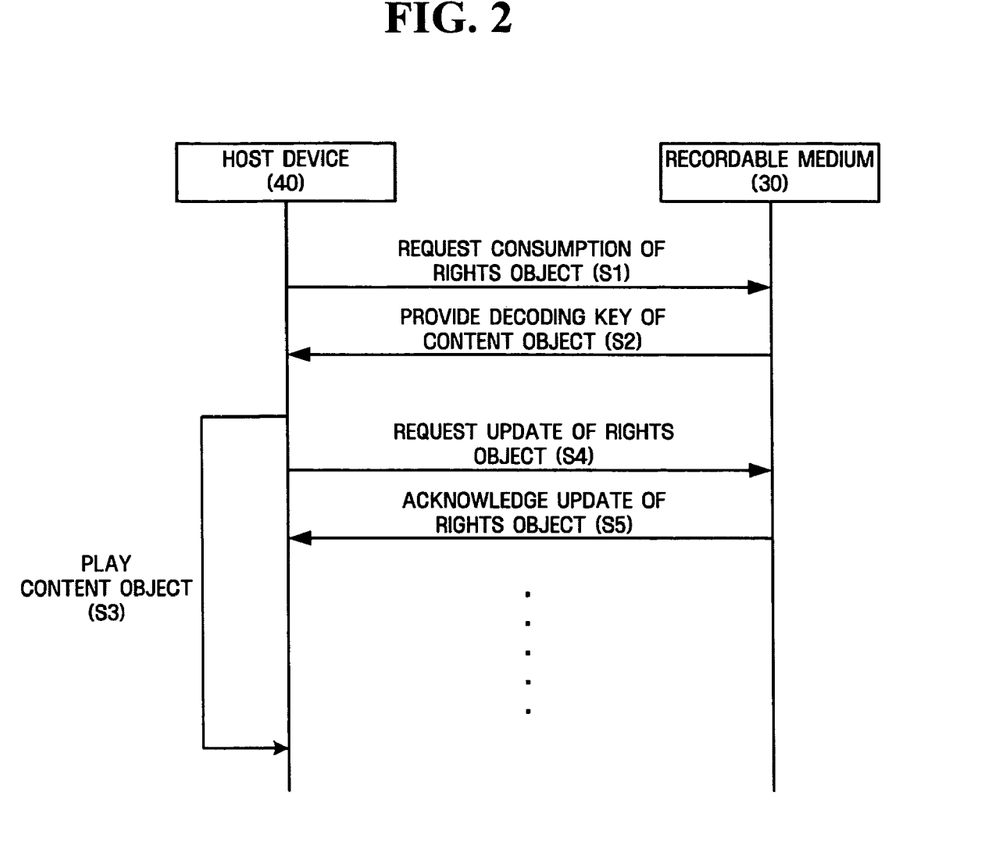
FIG. 2 is a diagram showing a conventional operational process that occurs between a recordable medium having no internal power source and a host device accessing a recordable medium and receiving a rights object.

FIG. 2 is a diagram showing a conventional operational process that occurs between a recordable medium 30 having no internal power source and a host device 40 accessing a recordable medium and receiving a rights object.

The host device 40 first requests the consumption of the rights object from the recordable medium 30 at step S1. The recordable medium 30 provides the decoding key of a DRM content object to the host device 40 in response thereto at step S2. Thereafter, the host device 40 requests the update of the DRM rights object from the recordable medium 30 at step S4 while playing the DRM content object at step S3. The recordable medium 30 transfers a rights object update acknowledgement to the host device 40 in response to the request at step S5. Steps S4 and S5 are repeated until step S3 of playing the content object is completed.

In the existing technique, one device selects the best time information and stores the selected best time information therein. Therefore, the best time information is merely selected from a plurality of pieces of external time information, and additional new time information is not created.

If only devices that cannot directly access a clock source exist, or if it is temporarily impossible to access a clock source, further update of the time information is impossible after all of the devices have been updated based on the latest time information to synchronize the devices. In addition, devices having no internal power source must frequently receive time information from another device or an external time information source, such as a clock source.

Furthermore, in the case where a process of periodically updating time information is repeated as shown in FIG. 2, communication between devices may be degraded due to the process. The time information of the recordable medium remains inaccurate until the next update.

SUMMARY OF THE INVENTION

Accordingly, the present invention has been made keeping in mind the above problems occurring in the prior art, and an object of the present invention is to provide a secure clock that approximates a clock source by utilizing an internal counter as a clock in a device that does not have an internal power source and cannot access an external secure clock source.

In an exemplary embodiment, the present invention provides a slave device having no internal power source, the slave device accessing a host device having an internal power source and transmitting and receiving data, the slave device including a clock control unit performing control such that time information of the host device is acquired and a counter value corresponding to the acquired time information is set, when the clock control unit is connected to the host device and is supplied with power from the host device; a counter changing the set counter value in steps of a predetermined value at regular time intervals while the power is supplied; and a time information unit updating current time information to correspond to the changed counter value while the power is supplied.

In addition, in order to accomplish the above object, the present invention provides a method of implementing a clock of a slave device having no internal power source, the slave device accessing a host device having an internal power source and transmitting and receiving data, the method including performing control such that time information of the host device is acquired and a counter value corresponding to the acquired time information is set when the slave device is connected to the host device and receives power from the host device; changing the set counter value in steps of a predetermined value at regular time intervals while the power is supplied; and storing current time information corresponding to the changed counter value while the power is supplied.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE EXEMPLARY EMBODIMENTS

The present invention will now be described in detail in connection with exemplary embodiments with reference to the accompanying drawings. Merits and characteristics of the invention, and methods of accomplishing them will become more apparent from the following exemplary embodiments taken in conjunction with the accompanying drawings. However, the present invention is not limited to the disclosed exemplary embodiments, but may be implemented in various manners. The exemplary embodiments are provided to complete the disclosure of the present invention and to allow those having ordinary skill in the art to understand the scope of the present invention. The present invention is defined by the category of the claims. The same reference numbers will be used throughout the drawings to refer to the same or like parts.

The present invention provides a technique for implementing a clock in a slave device that does not have an internal power source and cannot directly access the clock source. In this technique, a host device accesses a secure clock source and sets accurate time information. While the slave device accesses the host device and is supplied with external power, the clock of the slave device operates as a counter. Accordingly, although the slave device does not have an internal power source, a clock that approximates a secure clock as closely as possible can be implemented.

Several terms used in the present invention will be defined first as follows.

Clock: This refers to a system or module indicating the internal time in a system. The time indicated by the clock can be indicated on a scale different from that used for time in real life.

Secure clock: This guarantees that time information can be set only when a device is connected to a secure and trustworthy clock source. Arbitrary setting by a user is not allowed. When a device cannot access the secure clock source, the device can access another device and set the latest time as the current time thereof.

Clock source: This refers to a clock system operated by a trustworthy third party, and provides accurate current time information. If there are several clock sources, a means for synchronizing the pieces of time information of the clock sources is included.

Counter: This refers to a memory device that increases or decreases (hereinafter referred to as "change") a current count in steps of one or a predetermined value at predetermined regular time intervals.

DRM: This refers to a technique in which access to encrypted digital content is open to everyone, but digital rights, called a "rights object", are required in order to decode encrypted digital content, called a "content object".

Content object: This refers to digital content, the copyright of which is protected by the DRM technique.

Rights object: This includes a decoding key for decoding digital content, use permission information for defining the type of use of digital content, and use restriction information for restricting the use of digital content.

Consumption: This refers to a process of updating the information of the rights object after the use of a content object, thus increasing the degree of restriction upon subsequent use.

State information: This refers to information for describing the current situation after the rights object has been consumed.

Figure 3:
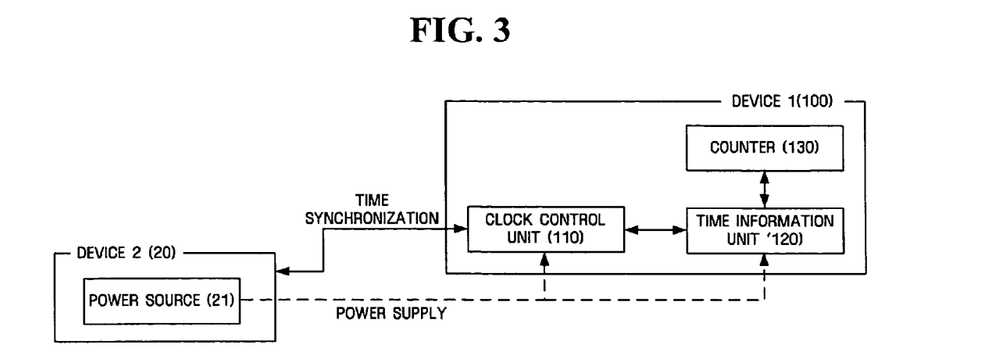
FIG. 3 is a block diagram showing the overall construction of a system according to an exemplary embodiment of the present invention.

FIG. 3 is a block diagram showing the overall construction of a system according to an exemplary embodiment of the present invention.

A device 1 (100) is a slave device that does not have an internal power source. For this reason, the device 1 (100) uses the power of another device 2 (20) and can operate only when it is connected to the device 2 (20).

The device 1 (100) cannot directly access the clock source (refer to 30 of FIG. 1) because it does not have an internal power source. Therefore, the device 1 (100) can acquire time information only by accessing the other device 2 (20).

If the device 1 (100) is connected to the device 2 (20), the current time of one of the two devices 20 and 100 that has the latest time is selected as a reference time. The times of the two devices 20 and 100 are synchronized with each other based on the reference time.

A clock control unit 110 acquires time information from the device 2 (20) connected thereto. If the acquired time information is newer than its time information, the clock control unit 110 controls a time information unit 120 such that the acquired time information is set. However, since there is no additional clock in the device 1 (100), a counter 130 is used as the clock. That is, after the relationship between the counter value and the time is established, the counter value is set as the corresponding time.

Furthermore, the clock control unit 110 can preclude a user from directly attempting to modify time information.

The time information unit 120 stores current time information under the control of the clock control unit 110. The time information unit 120 changes the stored time information in steps of a predetermined value (typically, one) at regular time intervals while operating in conjunction with the counter 130. In this case, the time interval corresponds to the changed counter value. The device 1 (100) can be aware of the current time through a combination of the stored time information and the changed counter value.

Figure 4:
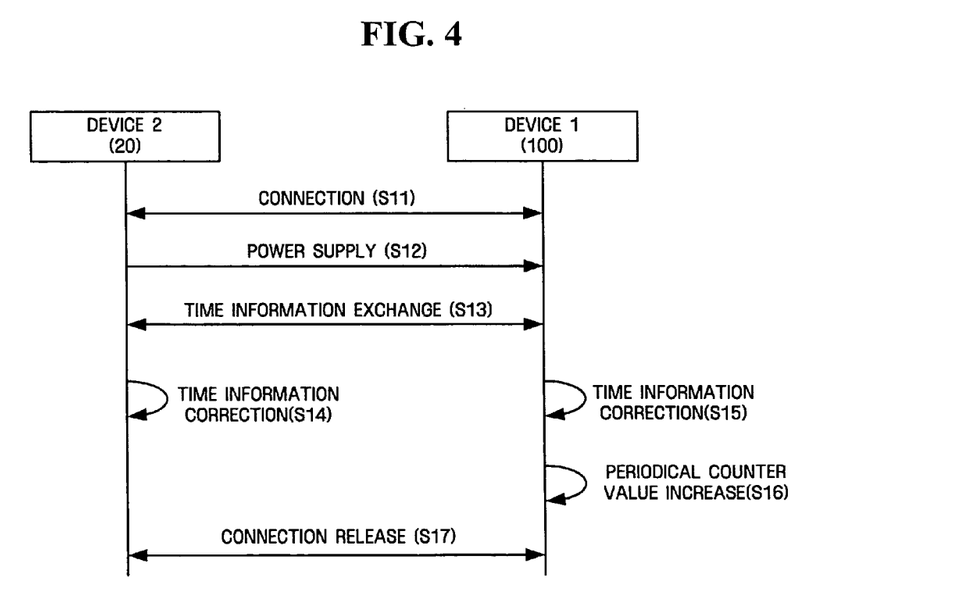
FIG. 4 is a flowchart showing an operational process that is performed in the system of FIG. 3.

FIG. 4 is a diagram showing an operational process that is performed in the system of FIG. 3.

The device 1 (100) and the device 2 (20) are connected to each other at step S11. Such a connection may be performed through the manipulation of a user, or may be performed by the device 2 (20).

If the device 1 (100) and the device 2 (20) are connected to each other, the power of the device 2 (20) is also supplied to the device 1 (100) at step S12. To complete the connection between the device 1 (100) and the device 2 (20), auxiliary protocols, such as an authentication protocol, can be further included.

The device 1 (100) and the device 2 (20) compare their own time information with each other's time information. If the other's time information is newer than its own time information, the device 1 (100) or the device 2 (20) sets the other's time information as its own time information at step S113.

The device 2 (20) corrects its own time information based on the latest time information at step S14. Meanwhile, the new time information of the device 1 (100) is updated and is stored in the time information unit 120 of the device 1 (100) at step S15. The time information unit 120 changes the value of the counter 130 in steps of a predetermined value at regular time intervals at step S16. The change of the counter performed at a specific time interval is maintained while the device 1 (100) is connected to the device 2 (20) and is supplied with power. Accordingly, the time information of the device 1 (100) is accurately maintained during the period.

Thereafter, if the connection between the device 1 (100) and the device 2 (20) is released at step S17, the device 1 (100) is no longer supplied with power. However, the latest time information stored in the time information unit 120 of the device 1 (100) (stored in non-volatile memory such as flash memory) is maintained without being lost.

If the device 1 (100) is connected to the device 2 (20) or some other device, the counter of the device 1 (100) is changed again at given regular time intervals.

Figure 5:
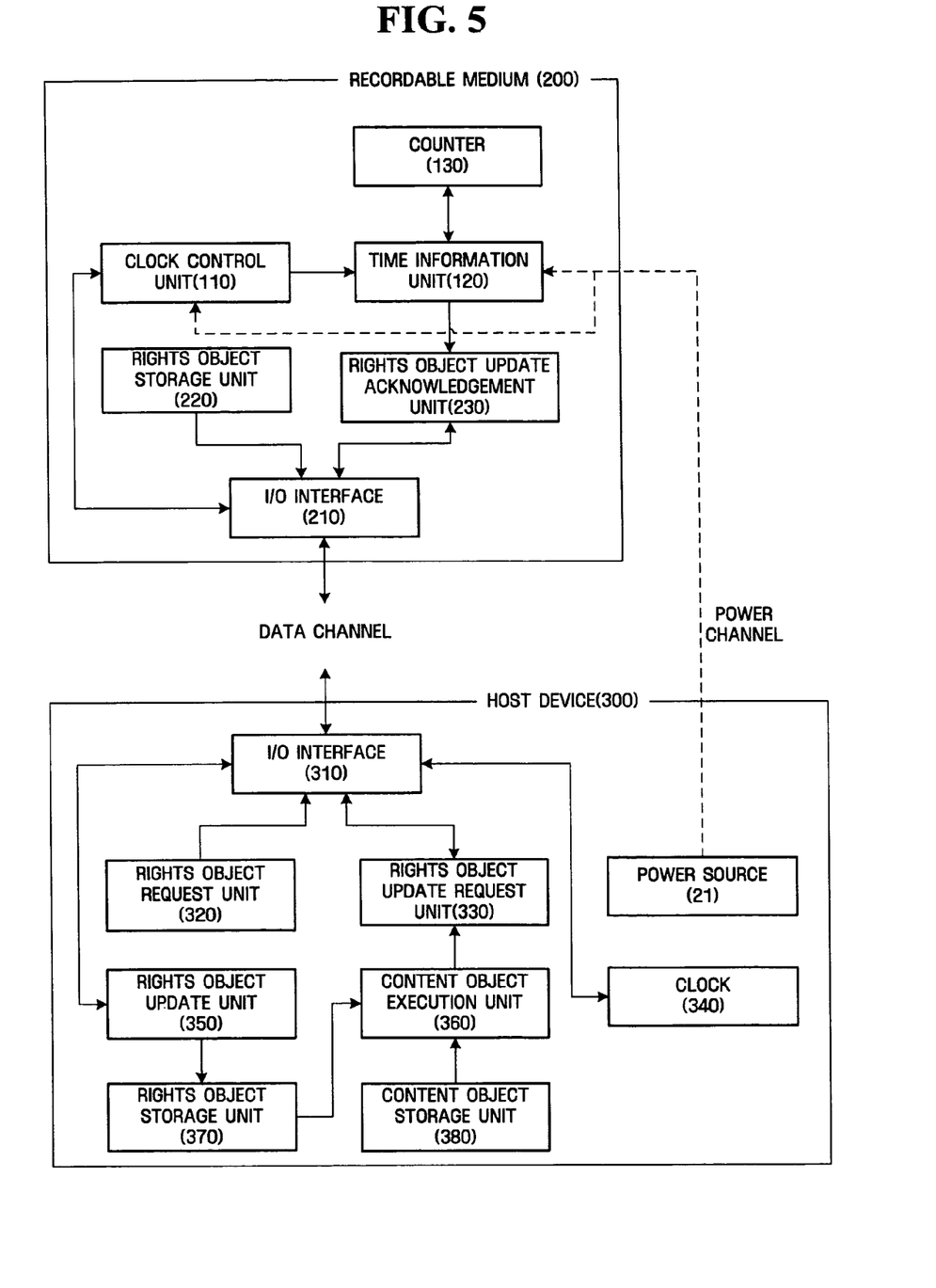
FIG. 5 is a block diagram showing a system when the concept of the present invention is applied to a recordable medium.

FIG. 5 is a block diagram showing the construction of a system when an exemplary concept of the present invention is applied to a recordable medium. As an example, the recordable medium may be a removable memory card and/or a recordable medium complying with the Secure MultiMediaCard (SecureMMC) standard.

A recordable medium 200 supplies a host device 300 with a rights object that allows an encrypted content object to be executed. The host device 300 decodes and plays the encrypted content object using the rights object. In this case, the recordable medium 200 is supplied with power from a power source of the host device 300 because it is not generally equipped with a power source.

The recordable medium 200 may include an Input/Output (I/O) interface 210, a rights object storage unit 220, a rights object update acknowledgement unit 230, a clock control unit 110, a time information unit 120, and a counter 130.

The I/O interface 210 is connected to the host device 300 and transmits and receives various data to and from the host device 300.

The rights object storage unit 220 stores a rights object for a content object. The rights object may be initially stored in the recordable medium 200, or may be received via a secure network and then stored in the recordable medium 200.

If a rights object update request is received from the host device 300, the rights object update acknowledgement unit 230 generates an acknowledgement of the request and transmits the generated acknowledgement to the host device 300. The rights object update acknowledgement unit 230 uses current time information stored in the time information unit 120. For example, it is assumed that an original rights object indicates the right to execute a content object for one hour. In this case, if 40 minutes has elapsed from a content play start point on the basis of the time information unit 120, the rights object update acknowledgement unit 230 sends a message acknowledging the update of the rights object for the remaining 20 minutes to the host device 300.

As described above, in the present invention, the time information unit 120 contained in the recordable medium 200 is used as a reference for updating the rights object. The reason for this is that, when a user arbitrarily changes the time information of the host device 300 after the time information has been synchronized with that of the host device 300, the rights object can be securely updated using the secure clock provided by the time information unit 120.

The clock control unit 110 acquires time information from the host device 300. If the time information of the clock control unit 110 is older than the received time information, the clock control unit 110 controls the time information unit 120 such that the acquired time information is set. In other words, the clock control unit 110 acquires the time information of the host device 300 and controls the time information unit 120 such that it sets a counter value corresponding to the acquired time information when it is connected to the host device 300 and is supplied with power from the host device 300.

Furthermore, the clock control unit 110 can prevent a user from arbitrarily changing time information by precluding the user from directly attempting to modify the time information.

The counter 130 changes the set counter value in steps of a predetermined value (in most cases, one) at given time intervals while being supplied with power. The counter 130 supplies the time information unit 120 with a current counter value. The time interval corresponds to the predetermined value.

The time information unit 120 stores current time information under the control of the clock control unit 110. That is, the time information unit 120 stores the current time, corresponding to the changed counter value, while being powered. The time information unit 120 can be made aware of the current time through a combination of the changed counter value and the time information set by the clock control unit 110.

Figure 6:
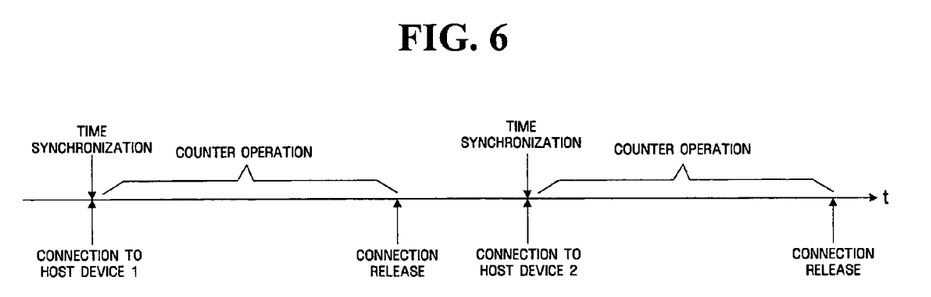
FIG. 6 is a diagram conceptually showing the basic operation of the time information unit of the recordable medium.

FIG. 6 is a view conceptually illustrating the basic operation of the time information unit 120 of a recordable medium 200. When the recordable medium 200 is connected to a host device 1 and time synchronization is performed by the clock control unit 110, the time information unit 120 can be made aware of current time information at a given time point through the operation of the counter 130 in the recordable medium 200. Thereafter, after the connection between the recordable medium 200 and the host device 1 has been released, the recordable medium 200 is connected to another host device 2 again. The time information unit 120 can be aware of current time information through the operation of the counter after time synchronization until the connection is released.

Referring back to FIG. 5, the host device 300 includes an I/O interface 310, a rights object request unit 320, a rights object update request unit 330, a clock 340, a rights object update unit 350, a content object execution unit 360, a rights object storage unit 370, a content object storage unit 380, and a power source 21.

The I/O interface 310 accesses the recordable medium 200 and transmits and receives various data to and from the recordable medium 200.

The rights object request unit 320 requests a rights object stored in the recordable medium 200. In response thereto, the recordable medium 200 provides the host device 300 with the requested rights object.

The rights object update request unit 330 requests the recordable medium 200 to update a rights object for a content object, which is being executed at regular intervals or at a given time point, according to instructions from the content object execution unit 360.

The clock 340 is a module that provides time information within the host device 300. The clock 340 is a typical timepiece that can be consistently supplied with power, unlike the recordable medium 200.

The rights object update unit 350 updates the rights object stored in the rights object storage unit 370 if a rights object update acknowledgement is received from the recordable medium 200. For example, if a message acknowledging the update of the execution right for the remaining 20 minutes of a content object is received from the rights object update acknowledgement unit 230, the rights object update unit 350 updates the content of the rights object.

The content object storage unit 380 stores a publicly distributed encrypted content object. The distribution of the encrypted content object may be performed via any path, such as an insecure public network or a private network.

The content object execution unit 360 executes the content object stored in the content object storage unit 380 to the extent allowed by rights corresponding to a rights object stored in the rights object storage unit 370. The rights may include rights depending on various policies, such as a possible play time, a play end time, and the number of repetitions of play.

The power source 21 supplies power to the respective elements of the host device 300 and also supplies power to the time information unit 120 and clock control unit 110 of the recordable medium 200. For this purpose, a power channel for supplying power, as well as a data channel for transmitting and receiving data, is included between the recordable medium 200 and the host device 300.

Each of the elements of FIGS. 3 and 5 may refer to software, or hardware, such as a Field-Programmable Gate Array (FPGA) or an Application-Specific Integrated Circuit (ASIC). However, the elements are not limited to software or hardware, but may be implemented in an addressable storage medium or may be constructed to run on one or more processors. The functions provided within the elements may be implemented using subdivided constituent elements, or a plurality of elements may be combined into a single element that performs a specific function.

Figure 7:
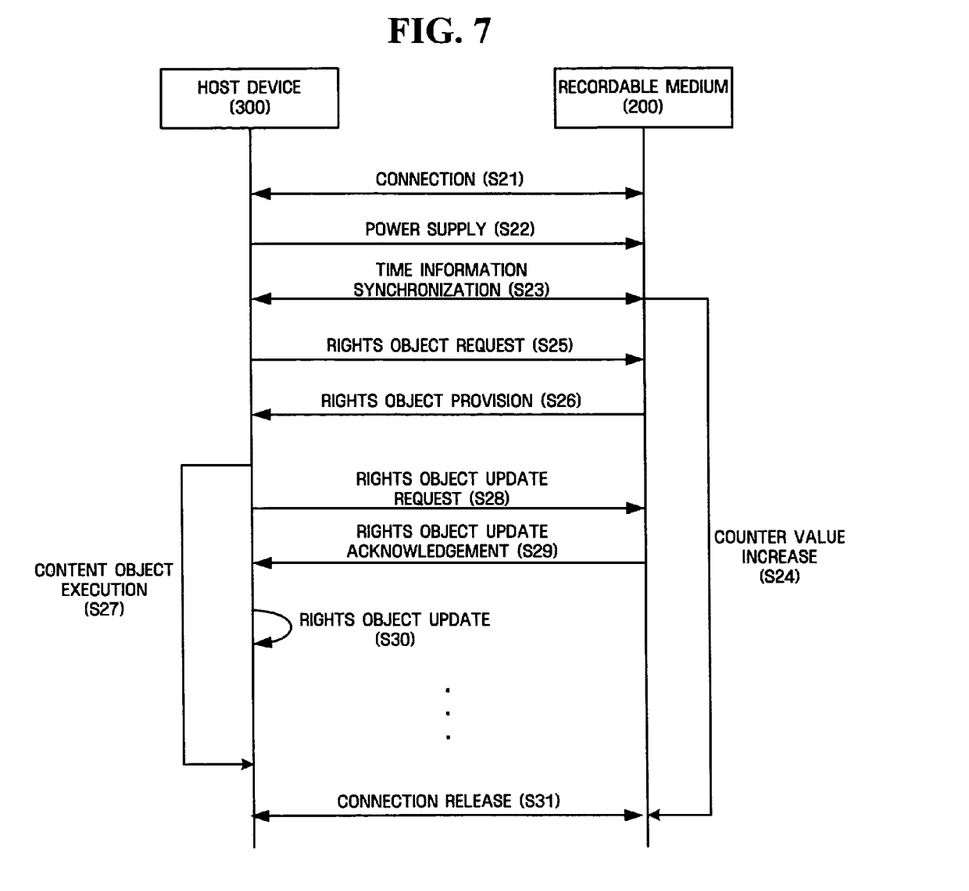
FIG. 7 is a flowchart showing an operational process that is performed in the system of FIG. 5.

FIG. 7 is a flowchart showing an operational process that is performed in the system of FIG. 5.

The recordable medium 200 and the host device 300 are first connected to each other at step S21. The connection refers to the connection of both a data channel and a power channel.

If the recordable medium 200 and the host device 300 are connected to each other, the power of the host device 300 is also supplied to the recordable medium 200 through the power channel at step S22. All of the transmission and reception processes between the two 200 and 300 are performed through the data channel.

The pieces of time information of the two 200 and 300 are synchronized with each other based on the latest time information of the two 200 and 300 at step S23. From this time, the time information unit 120 of the recordable medium 200 can be made aware of the current time by changing the counter value of the counter 130 in steps of a predetermined value at regular time intervals at step S24. Step S24 of changing the counter value is repeatedly performed until the connection between the two 200 and 300 is released at step S31.

The host device 300 requests a rights object for a given content object from the recordable medium 200 through the rights object request unit 320 at step S25. In response thereto, the recordable medium 200 supplies the rights object to the host device 300 at step S26.

The host device 300 that has received the rights object executes the content object through the content object execution unit 360. At this time, the provided rights object is used to decode the content object.

Thereafter, the host device 300 requests the update of the rights object from the recordable medium 200, periodically or non-periodically, at step S28. The recordable medium 200 provides the host device 300 with an acknowledgement of the update request for the rights object on the basis of the time information of the time information unit 120 at step S29. The host device 300 updates the content of the rights object through the rights object update unit 350 in response to the acknowledgement and stores the updated content in the rights object storage unit 370 at step S30.

Steps S28 to S30 are repeated until the execution of the content object is terminated or the rights included in the rights object expire.

Meanwhile, at step S25 of requesting the rights object and step S28 of requesting the update of the rights object, the time information of the recordable medium 200 can be corrected at any time by transmitting the request with corresponding time information included in the predetermined region thereof. In this case, step S23 of synchronizing pieces of time information may be omitted.

In the description of FIG. 7, after the host device 300 and the recordable medium 200 are connected to each other and time synchronization is performed at step S23, the recordable medium 200 becomes aware of time information using the internal counter. In another exemplary embodiment of the present invention, however, when a message requesting the rights object at step S25 and a message requesting the update of the rights object at step S28 are transmitted to the recordable medium 200, time information may be included in the predetermined fields of the request messages. In this case, the recordable medium 200 does not necessarily include the counter 130 and can update the current time based on time information included in the request messages received periodically or non-periodically.

In accordance with the present invention, a secure clock can be implemented even in a device having no internal power source. In this device, a clock consistently operates while being powered from outside. If the latest time information is received, stored time information can be updated to the latest time information. Therefore, a secure clock that approximates a stable and accurate clock can be provided.

Furthermore, since additional communication for transferring time information is not required between devices, the degradation of the performance of the entire system can be reduced.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A slave device having no internal power source, the slave device accessing a host device having an internal power source and transmitting and receiving data, the slave device comprising:
a clock control unit which performs control such that time information of the host device is acquired and a counter value corresponding to the acquired time information is set, if the clock control unit is connected to the host device and is supplied with power from the host device;
a counter which changes the set counter value in steps of a predetermined value at regular time intervals while the power is supplied;
a time information unit which updates current time information to correspond to the counter value changed by the counter while the power is supplied;
a rights object storage unit which stores a rights object for a content object; and
a rights object update acknowledgement unit which generates an acknowledgement and transmits the generated acknowledgement to the host device, when there is a request for an update of the rights object from the host device,
wherein the acknowledgement is based on the time information stored in the time information unit, and
wherein the host supplies power to the clock control unit and the time information unit.

2. The slave device of claim 1, wherein the time information unit stores the time information at a time point at which a connection to the host device is released.

3. The slave device of claim 1, wherein the slave device is implemented in a Secure MultiMediaCard form.

4. The slave device of claim 3, wherein the rights object includes at least one of a possible play time, a play end time, and a number of repetitions of play.

5. The slave device of claim 1, wherein the predetermined value is one.

6. The slave device of claim 1, wherein a data channel which transmits and receives various data and a power channel which receives the power are included between the host device and the slave device.

7. The slave device of claim 1, wherein the time information unit stores a most recent counter value of the counter when a connection to the host device is released.

8. A system comprising:
a slave device having no internal power source, the slave device accessing a host device having an internal power source and transmitting and receiving data, the slave device comprising:
a clock control unit which performs control such that time information of the host device is acquired and a counter value corresponding to the acquired time information is set, if the clock control unit is connected to the host device and is supplied with power from the host device;
a counter which changes the set counter value in steps of a predetermined value at regular time intervals while the power is supplied;
a time information unit which updates current time information to correspond to the counter value changed by the counter while the power is supplied;
a rights object storage unit which stores a rights object for a content object; and
a rights object update acknowledgement unit which generates an acknowledgement and transmits the generated acknowledgement to the host device, when there is a request for an update of the rights object from the host device;
wherein the acknowledgement is based on the time information stored in the time information unit; and
the host device comprising:
a rights object update unit which updates an internal rights object;
a content object execution unit which executes the content object to an extent allowed by rights corresponding to the updated internal rights object; and
a rights object update request unit which requests the slave device for the acknowledgement to update the internal rights object for the content object at regular time intervals or at a given time point according to instructions from the content object execution unit,
wherein the host supplies power to the clock control unit and the time information unit.

9. The system of claim 8, wherein the host device further comprises:
a rights object request unit which requests the rights object stored in the slave device; and
an I/O interface which receives the acknowledgement from the slave device;
wherein the update of the rights object is performed in response to the acknowledgement.

10. A slave device having no internal power source, the slave device accessing a host device having an internal power source and transmitting and receiving data, the slave device comprising:
an Input/Output (I/O) interface which receives a message which requests a rights object or an update of the rights object and includes time information of the host device, from the host device, when the I/O interface is connected to the host device and receives power from the host device;
a time information unit which updates and stores current time information using the time information included in the received message while the power is supplied, wherein the host supplies power to the time information unit;
a rights object storage unit which stores the rights object for a content object; and
a rights object update acknowledgement unit which generates an acknowledgement and transmits the generated acknowledgement to the host device, when there is a request for the update of the rights object from the host device, wherein the acknowledgement is based on the time information stored in the time information unit.

11. A method of implementing a clock of a slave device having no internal power source, the slave device accessing a host device having an internal power source and transmitting and receiving data, the method comprising:
performing control such that time information of the host device is acquired and a counter value corresponding to the acquired time information is set when the slave device is connected to the host device and receives power from the host device;
changing the set counter value in steps of a predetermined value at regular time intervals while the power is supplied;
storing, by a time information unit of the slave device, current time information corresponding to the changed counter value while the power is supplied, wherein the host supplies power to the time information unit
storing a rights object for a content object; and
generating an acknowledgement and transmitting the generated acknowledgement to the host device when there is a request for an update of the rights object from the host device,
wherein the acknowledgement is based on the stored time information.

12. The method of claim 11, wherein the slave device is implemented in a Secure MultiMediaCard (SecureMMC) form.

13. The method of claim 12, further comprising:
updating an internal rights object;
executing the content object to an extent allowed by rights corresponding to the updated rights object; and
requesting the slave device to update the rights object for the content object at regular time intervals or at a given time point according to instructions.

14. The method of claim 13, further comprising:
requesting the rights object stored in the slave device; and
receiving the acknowledgement from the slave device;
wherein the update of the rights object is performed in response to the acknowledgement.

15. The method of claim 12, wherein the rights object includes at least one of a possible play time, a play end time, and a number of repetitions of play.

16. The method of claim 11, wherein the predetermined value is one.

17. The method of claim 11, wherein a data channel which transmits and receives various data and a power channel which receives the power are included between the host device and the slave device.

18. The method of claim 11, wherein the time information unit stores a most recent counter value of the counter when a connection to the host device is released.

* * * * *